United States Patent [19]
Suyama

[11] Patent Number: 5,493,466
[45] Date of Patent: Feb. 20, 1996

[54] COMPOSITE THIN FILM RECORDING/REPRODUCING HEAD WITH MR REPRODUCING HEAD HAVING GREATER TRACK WIDTH THAN RECORDING HEAD

[75] Inventor: Hideo Suyama, Miyagi, Japan

[73] Assignee: Sony Corporation, Tokyo, Japan

[21] Appl. No.: 264,175

[22] Filed: Jun. 22, 1994

Related U.S. Application Data

[63] Continuation of Ser. No. 907,299, Jul. 1, 1992, abandoned.

[30] Foreign Application Priority Data

Jul. 2, 1991 [JP] Japan .................. 3-161856

[51] Int. Cl.$^6$ ................ G11B 5/39; G11B 5/147
[52] U.S. Cl. ................ 360/113; 360/126; 360/121
[58] Field of Search ................ 360/113, 121, 360/125, 126, 135

[56] References Cited

U.S. PATENT DOCUMENTS

| | | | |
|---|---|---|---|
| 4,356,523 | 10/1982 | Yeh | 360/113 |
| 4,445,150 | 4/1984 | Nakajima et al. | 360/22 |
| 4,703,380 | 10/1987 | Imamura et al. | 360/121 |
| 4,841,398 | 6/1989 | Mowry | 360/113 |
| 4,860,138 | 8/1989 | Vinal et al. | 360/113 |
| 4,885,649 | 12/1989 | Das | 360/113 |
| 4,896,235 | 1/1990 | Takino et al. | 360/113 |
| 4,912,585 | 3/1990 | Belser et al. | 360/135 |
| 4,967,298 | 10/1990 | Mowry | 360/113 |
| 4,987,509 | 1/1991 | Gill et al. | 360/113 |
| 5,073,836 | 12/1991 | Gill et al. | 360/113 |
| 5,079,662 | 1/1992 | Kawakami et al. | 360/113 |
| 5,097,371 | 3/1992 | Somers | 360/113 |
| 5,111,352 | 5/1992 | Das et al. | 360/113 |
| 5,168,409 | 12/1992 | Koyama et al. | 360/113 |
| 5,181,149 | 1/1993 | Katsumata et al. | 360/119 |

FOREIGN PATENT DOCUMENTS

| | | |
|---|---|---|
| 0279536 | 8/1988 | European Pat. Off. . |
| 0372420 | 6/1990 | European Pat. Off. . |
| 2047943 | 12/1980 | United Kingdom . |

OTHER PUBLICATIONS

Patent Abstracts of Japan, No. JP2094014, vol. 14, No. 301, Kawakami Hiroji et al. "Recording and Reproducing Compound Head and its Manufacture", Apr. 4, 1990.

Patent Abstracts of Japan, No. JP2168408, vol. 14, No. 434, Shigemata Kazuhiro et al. "Recording and Reproducing Magnetic Head and its Manufacture", 28 Jun., 1990.

Patent Abstracts of Japan, No. JP2208812, vol. 14, No. 504, Koyama Naoki et al. "Recording Reseparation/composition Type Magnetic Head", 20 Aug. 1990.

Patent Abstracts of Japan, No. JP2226509, vol. 14, No. 534, Suzuki Akihiro "Magneto–Resistance Effect Head", 10 Sep. 1990.

Patent Abstract of Japan, No. JP4205705, No. 16, No. 547, Morijiri Makoto et al. "Thin Film Magnetic Head and Magnetic Disk Device", 27 Jul. 1992.

*Primary Examiner*—Stuart S. Levy
*Assistant Examiner*—Jefferson Evans
*Attorney, Agent, or Firm*—Hill, Steadman & Simpson

[57] ABSTRACT

A composite thin film recording/reproducing head comprises, in an integral laminate construction: a magnetoresistance effect thin film reproducing head having a magnetoresistance effect element; and an inductive thin film recording head. The track width of the magnetoresistance effect thin film reproducing head is greater than that of the inductive thin film recording head. The reproducing output of the composite thin film recording/reproducing head can be enhanced without entailing increase in reproducing output noise and the variation of the reproducing output can be suppressed, so that the composite thin film recording/reproducing head has improved reproducing output characteristics.

1 Claim, 4 Drawing Sheets

COMPOSITE THIN FILM RECORDING/REPRODUCING HEAD WITH MR REPRODUCING HEAD HAVING GREATER TRACK WIDTH THAN RECORDING HEAD

This is a continuation of application Ser. No. 07/907,299, filed Jul. 1, 1992, now abandoned.

BACKGROUND OF THE INVENTION

1. Field of the Invention

The present invention relates to a composite thin film recording/reproducing head integrally comprising a magneto-resistance effect thin film reproducing head (hereinafter referred to as "MR thin film reproducing head") having a magnetoresistance effect element (hereinafter referred to as "MR element"), and an inductive thin film recording head.

2. Description of the Prior Art.

A recording medium of a discrete track type having discrete tracks formed by removing portions of the magnetic layer between the adjacent tracks to increase recording density is used as a magnetic recording medium or a magneto-optic recording medium. Recording density on an ordinary high-density recording medium, such as a hard disk, is in the range of 4000 tpi (tracks per inch) to 5000 tpi. Therefore, the track pitch is in the range of about 5 to about 6 μm and the track width is on the order of 3 μm. If such a high-density recording medium is provided with a continuous magnetic layer, relatively large noise, i.e., what is known as edge noise, is generated by the high-density recording medium, particularly, by portions of the high-density recording medium other than the tracks in reproducing recorded signals from the high-density recording medium. The edge noise is attributable mainly to noise of unstable phase written in the recording medium during recording operation by a portion of the recording head at a distance from the recording gap. Therefore, it is desirable to use a recording medium of a discrete track type for high-density recording.

The recording medium of a discrete track type is formed, for example, by forming a magnetic layer over the entire surface of a substrate having the shape of a disk by sputtering or evaporation, and subjecting the magnetic layer to a photolithographic process or the like to form a magnetic layer of a pattern of concentric circles or a spiral curve.

In recording signals on or reproducing recorded signals from the recording medium 23 by, for example, a floating magnetic head, a magnetic head 30 attached to a surface of a floating slider 31 facing the recording medium 23 is kept afloat over the recording tracks 21 of the recording medium 23 with a small gap between the magnetic head 30 and the surface of the recording medium 23 by air currents produced by the rotating recording medium 23 as shown in FIG. 6.

Various magnetic heads have been developed. For example, a MR thin film magnetic head having excellent shortwave sensitivity is used often as the reproducing magnetic head of the magnetic recording/reproducing head of a hard disk drive. Various composite thin film recording/reproducing heads each comprising a conventional inductive thin film recording head and a MR thin film reproducing head have been proposed.

Referring to FIG. 7 showing a composite MR/inductive thin film recording/reproducing head, a first magnetic layer 3 and a second magnetic layer 4 serving as shields for shielding a MR element 1 are formed respectively on the opposite sides of the MR element 1 on a floating slider or a base 6 attached to a floating slider so as to face the air bearing surface 7 of the composite MR/inductive thin film recording/reproducing head facing a magnetic recording medium, and nonmagnetic insulating layer 8 forming a recording magnetic gap, and a third magnetic layer 5 are formed over the first magnetic layer 3 and the second magnetic layer 4 so as to face the air bearing surface 7. A spiral head coil 2 is formed so as to surround the magnetically coupled back portions of the second magnetic layer 4 and the third magnetic layer 5. The second magnetic layer 4 and the third magnetic layer 5 constitute a recording head.

A front electrode 15 is formed near the MR element 1 on the side of the air bearing surface 7, and a back electrode 16 is formed on the other side of the MR element 1 to detect signal magnetic fields created by the recording medium facing the air bearing surface 7. A bias magnetic field is applied to the MR element 1 by a bias conductor 18.

Thus, a MR thin film magnetic head of what is known as a shield type having the MR element 1 formed between the first magnetic layer 3 and the second magnetic layer 4 is formed and an inductive magnetic head consisting of the second magnetic layer 4, the third magnetic layer 5, and the head coil 2 provided on a magnetic path including the second magnetic layer 4 and the third magnetic layer 5 is formed. The second magnetic layer 4 serves as a shield for the MR element in reproducing operation and as an inductive core in recording operation.

In the conventional composite MR/inductive thin film magnetic recording/reproducing head thus constructed, the width of the MR element 1 defining the track width $W_{TM}$ of the MR magnetic head, and the width of the third magnetic layer 5 defining the track width $W_{TI}$ of the inductive magnetic head are approximately equal to each other as shown in FIG. 8, and the optimization of the design of the MR/inductive thin film magnetic recording/reproducing head has been desired.

SUMMARY OF THE INVENTION

Accordingly, it is an object of the present invention to provide a composite thin film recording/reproducing head of a MR/inductive type having improved output characteristics.

In a first aspect of the present invention, a composite thin film recording/reproducing head of a laminate construction comprises a MR thin film reproducing head having a MR element, and an inductive thin film recording head, wherein the track width $W_{TM}$ of the MR thin film reproducing head is greater than the track width $W_{TI}$ of the inductive thin film recording head.

In a second aspect of the present invention, a composite thin film recording/reproducing head of a laminate construction comprises: a MR thin film reproducing head having a MR thin film element consisting of two MR magnetic layers and a nonmagnetic intermediate layer formed between the MR magnetic layers, and a front electrode formed so as to face a front surface facing a recording medium so that a signal current flows through the MR element in a direction perpendicular to the front surface; and an inductive thin film recording head; wherein the track width $W_{TM}$ of the MR thin film reproducing head is greater than the track width $W_{TI}$ of the inductive thin film recording head.

Since the track width $W_{TM}$ of the MR thin film reproducing head is greater than the track width $W_{TI}$ of the inductive thin film recording head, the composite thin film recording/reproducing head of the present invention has improved reproducing output characteristics.

Although the track width $W_{TM}$ of the MR thin film reproducing head is relatively large, rise in the noise level is avoided, which is inferred to be due to the following reasons.

The inventors of the present invention have found through studies that regions of a width along the opposite sides of a track on a magnetic recording medium are subject to the fringing effect of a signal magnetic field when signals are recorded by an inductive thin film recording head, and signals reproduced from the recording medium by a MR thin film reproducing head are affected relatively scarcely by the reproducing fringing effect of noise magnetic fields created by regions other than the recording regions.

FIG. 4 shows the relation between crosstalk output level and distance between a reproducing head and the recording track of a recording medium for a MR thin film reproducing head and an inductive thin film reproducing head. Signals were recorded on a magnetic recording medium provided with a continuous magnetic layer with an inductive thin film recording head. Although the width of the recording track formed by the inductive thin film recording head is greater than the width of the inductive thin film recording head owing to the recording fringing effect of the inductive thin film recording head, reproducing fringing output of the MR thin film reproducing head and the inductive thin film reproducing head was measured on an assumption that the width of the recording track is equal to that of the inductive thin film recording head. In FIG. 4 the distance x from the end of a recording track 21 to the end of a reproducing head 20 (FIG. 5) is measured to the right on the horizontal axis. In FIG. 4, the crosstalk output level is represented by the reproducing output relative to a norm zero corresponding to the reproducing output of the reproducing head 20 when the reproducing head 20 is located on the recording track 21. In FIG. 4, a curve M is for the MR thin film reproducing head and a curve I is for the inductive thin film reproducing head.

Suppose that reproducing fringing length is the distance from the end of the track to a position where the reproducing head is located and crosstalk is, for example, 30 dB or below. Then, from FIG. 4, reproducing fringing length is 4 µm for the inductive thin film reproducing head and 1 µm for the MR thin film reproducing head, which is relatively small; that is, crosstalk occurs in a relatively wide range when recorded signals are reproduced by the inductive thin film reproducing head and crosstalk occurs in a relatively narrow range when recorded signals are reproduced by the MR thin film reproducing head.

Accordingly, crosstalk, i.e., noise, does not increase even if the track width $W_{TM}$ of the MR thin film reproducing head is increased, and reproducing output can be enhanced because the width of the MR thin film reproducing head is relatively large.

When signals are recorded on and reproduced from a discrete recording medium, in particular, signals that will generate noise are not recorded, because there is no magnetic layer beside the recording tracks. Accordingly, at least a portion of the MR thin film reproducing head is located on the recording track because the MR thin film reproducing head has a large width and crosstalk attributable to noise signal reproduced from portions of the recording medium other than the recording tracks does not increase even if the MR thin film reproducing head is dislocated from the correct position corresponding to the recording track. Thus, allowance for the accuracy of positioning the reproducing head may be increased and the variation of the signal reproducing output due to the dislocation of the reproducing head from the correct position with respect to the recording track can be avoided.

The composite thin film recording/reproducing head in the second aspect of the present invention is provided with the MR thin film reproducing head having the MR thin film element consisting of the two MR magnetic layers and the nonmagnetic intermediate layer formed between the MR magnetic layers. Since the MR magnetic layers formed one over the other form a closed magnetic, magnetic leakage from the MR thin film reproducing head is reduced to the least extent and the reproducing fringing is further reduced. Accordingly, the composite thin film recording/reproducing head is able to provide increased reproducing output without entailing increase in reproducing output noise and, when the composite thin film recording/reproducing head is used in combination with a discrete recording medium in particular, the variation of the reproducing output can be suppressed and the reproducing output characteristics can be improved.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

First Embodiment

A composite thin film recording/reproducing head in a first embodiment according to the present invention will be described hereinafter with reference to FIGS. 1 and 2. The composite thin film recording/reproducing head comprises an inductive thin film recording head and a MR thin film reproducing head, and the magnetic gap of the inductive thin film recording head and that of the MR thin film reproducing head are formed separately.

Figure 1:
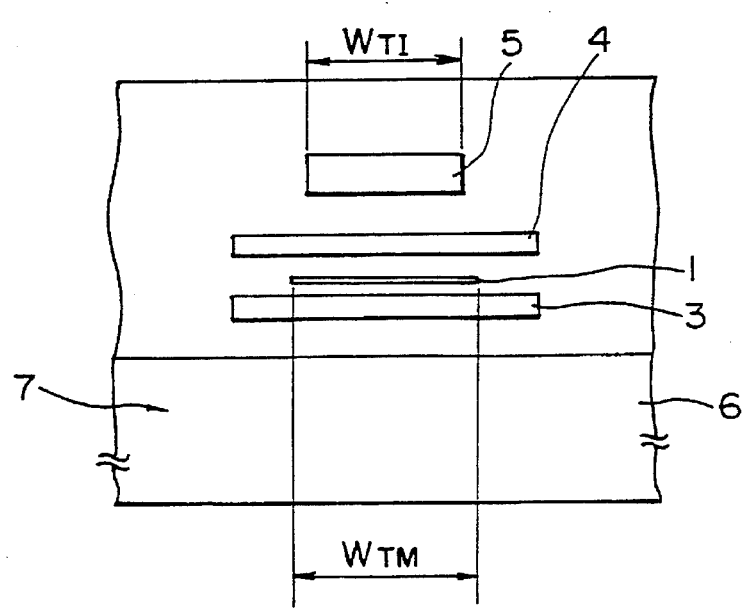
FIG. 1 is a schematic, enlarged sectional view of a composite thin film recording/reproducing head in a first embodiment according to the present invention.

Referring to FIG. 1, a MR thin film reproducing head is fabricated on a floating slider or a base 6 attached to a floating slider by forming a first magnetic layer 3 and a second magnetic layer 4, which serve as shields for the MR thin film reproducing head, one over the other so as to face an air bearing surface 7, forming a MR element 1 of a MR thin film and a bias conductor 18 between the magnetic layers 3 and 4. The MR element 1 and the bias conductor 18 are isolated from the magnetic layers 3 and 4 by a nonmagnetic insulating layer 8. The bias conductor 18 is formed across the MR element 1 to magnetize the MR element 1 in a predetermined direction to enable the MR element function in a range in which the magnetoresistive characteristics of the MR element 1 has excellent linearity and high sensitivity.

Figure 7:
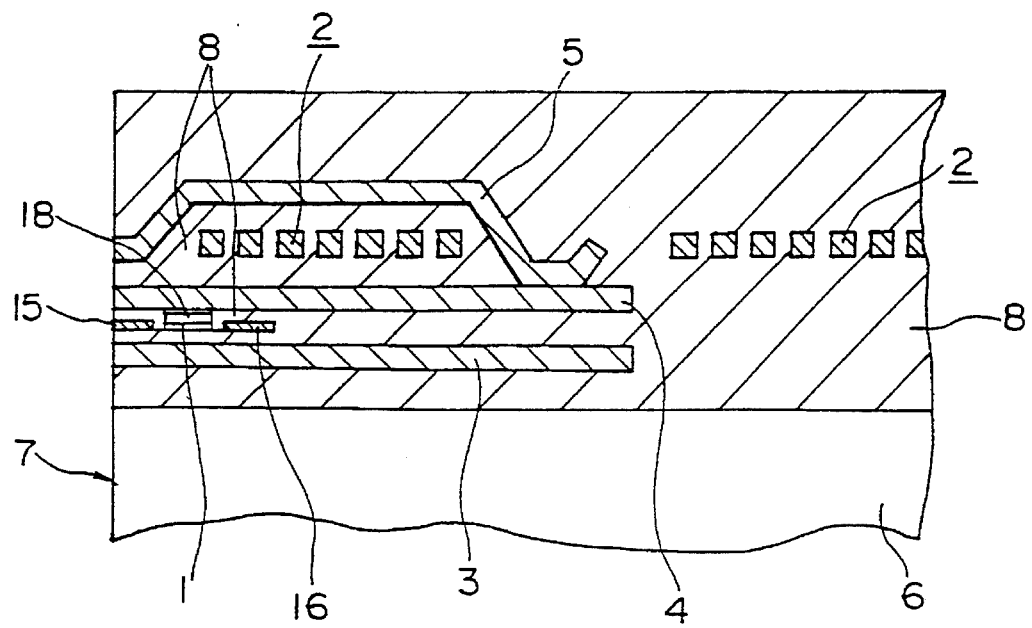
FIG. 7 is a schematic, enlarged sectional view of a prior art composite thin film recording/reproducing head.
Figure 8:
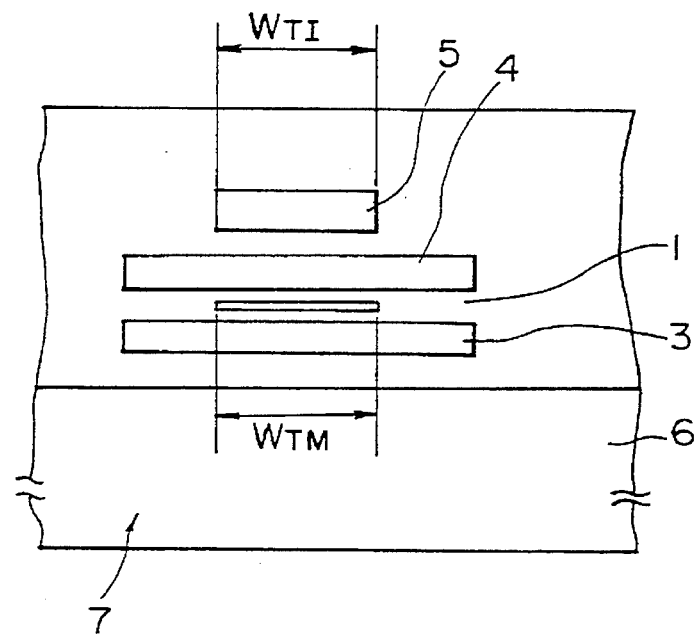
FIG. 8 is a schematic, enlarged sectional view of a prior art composite thin film recording/reproducing head.

A third magnetic layer 5 is formed on the other side of the second magnetic layer 4 with respect to the MR element 1 and is isolated from the second magnetic layer 4 by the nonmagnetic insulating layer 8. A spiral head coil, not shown, is formed, similarly to the spiral head coil 2 shown in FIG. 7, so as to surround the magnetically coupled back portions of the second magnetic layer 4 and the third magnetic layer 5.

Thus, the MR thin film reproducing head of what is known as a shield type comprising the first magnetic layer 3, the second magnetic layer 4 and the MR element 1 formed between the first magnetic layer 3 and the second magnetic layer 4, and an inductive thin film recording head comprising the second magnetic layer 4 and the third magnetic layer 5 forming a magnetic path and the spiral head coil surrounding the magnetic path are formed.

The track width $W_{TM}$ of the MR thin film reproducing head is the width of the MR element 1 on the air bearing surface 7, and the track width $W_{TI}$ of the inductive thin film recording head is the width of the third magnetic layer 5 on the air bearing surface 7. The MR element 1 indicated by continuous lines in FIG. 2 has a relatively small track width $W_{TM}$ of, for example, 3.5 µm, and the third magnetic layer 5 indicated by alternate long and short dash line in FIG. 2 has a relatively small width, i.e., the track width $W_{TI}$ of the inductive thin film recording head, of, for example, 3 µm.

Figure 6:
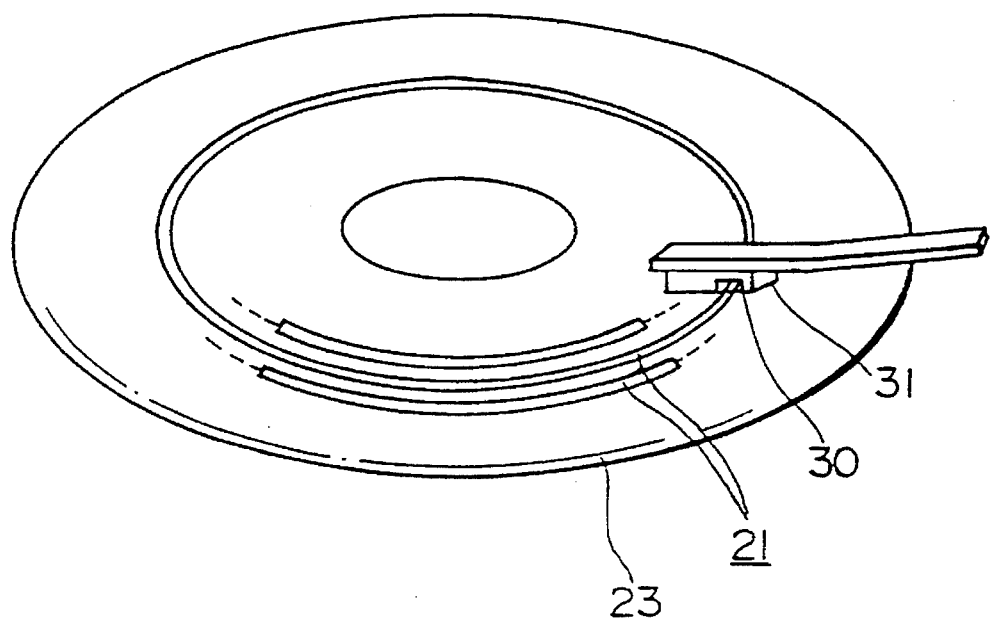
FIG. 6 is a schematic, enlarged perspective view of assistance in explaining a mode of recording signals on and reproducing signals from a conventional discrete recording medium.

Signals were recorded on and reproduced from a discrete recording medium 23 (FIG. 6) having recording tracks 21 of a track width of 3 µm arranged at a track pitch of 5 µm in a track density of 5000 tpi by using the composite thin film recording/reproducing head thus constructed. The variation of the reproducing output could be avoided without entailing increase in reproducing noise and the reproducing characteristics of the composite thin film recording/reproducing head were satisfactory.

Second Embodiment

A composite thin film recording/reproducing head in a second embodiment according to the present invention will be described hereinafter with reference to FIGS. 1 to 3. Basically, the composite thin film recording/reproducing head in the second embodiment is similar in construction to the composite thin film recording/reproducing head in the first embodiment shown in FIGS. 1 and 2, except that the composite thin film recording/reproducing head in the second embodiment is provided with a MR thin film reproducing head having a MR element 1 as shown in an enlarged perspective view in FIG. 3. As shown in FIG. 3 the composite thin film recording/reproducing head has a MR thin film reproducing head comprising the MR element 1 comprising magnetic layers 11 and 12, at least one of which is a magnetoresistance effect layer, and a nonmagnetic intermediate layer 13 sandwiched between the magnetic layers 11 and 12, a front electrode 15 formed so as to face the air bearing surface 17 facing a recording medium, and a back electrode 16. A signal current flows in the direction of the arrow i perpendicular to the air bearing surface 17.

Figure 2:
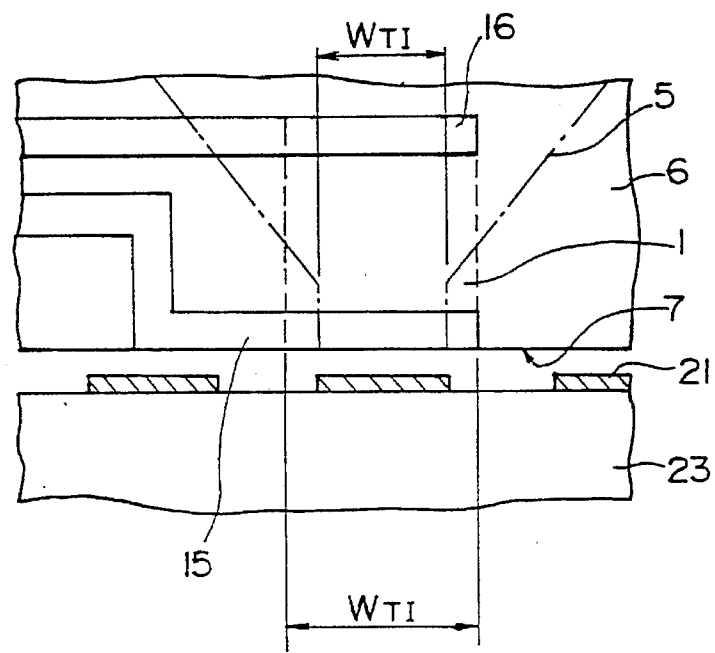
FIG. 2 is a typical side elevation of an essential portion of the composite thin film recording/reproducing head of FIG. 1.
Figure 3:
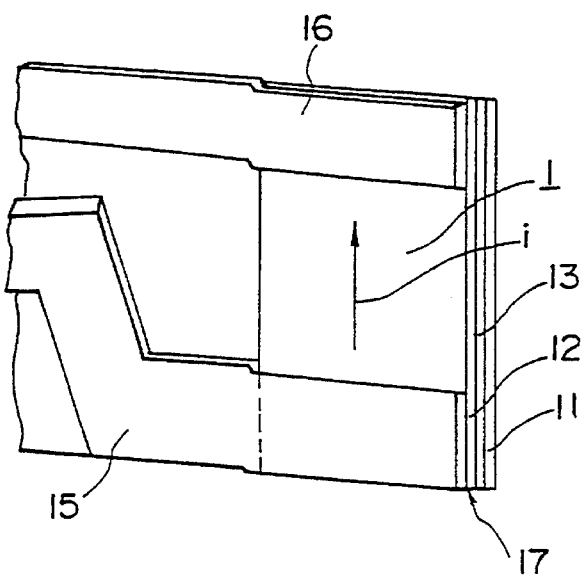
FIG. 3 is a schematic, enlarged perspective view of an essential portion of a composite thin film recording/reproducing head in a second embodiment according to the present invention.
Figure 4:
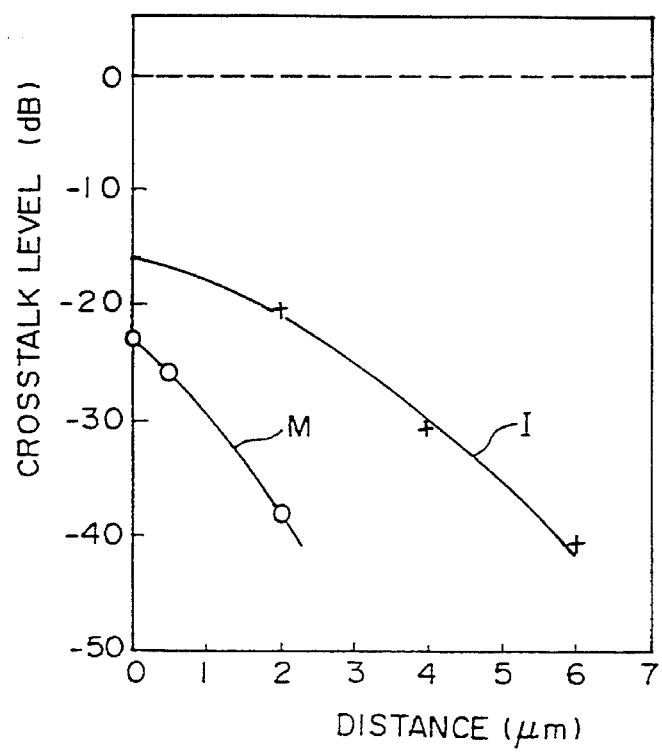
FIG. 4 is a graph showing the variation of the level of crosstalk with the distance from the end of a track to the end of a composite thin film recording/reproducing head for a composite thin film recording/reproducing head provided with a MR thin film reproducing head and a composite thin film recording/reproducing head provided with an inductive reproducing head.
Figure 5:
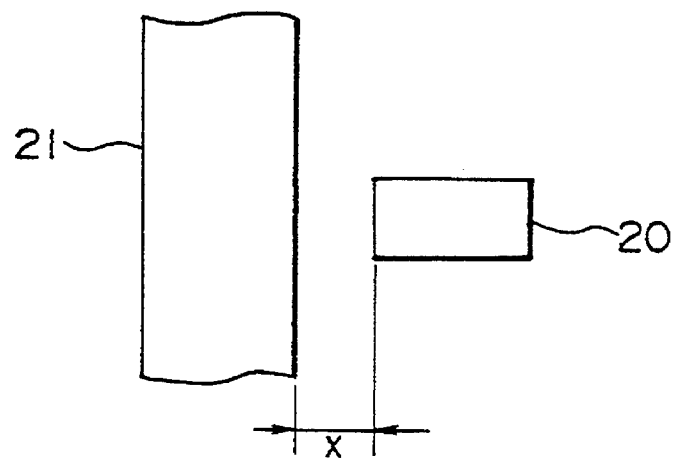
FIG. 5 is a view illustrating the positional relation between a recording track and a composite thin film recording/reproducing head.

As shown in FIG. 2, the track width $W_{TM}$ of the MR thin film reproducing head, i.e., the width of the MR element 1 on the air bearing surface 17, is greater than the track width $W_{TI}$ of the inductive thin film recording head, i.e., the width of the third magnetic layer 5. Concretely, the track width $W_{TM}$ of the MR thin film reproducing head is, for example, 3.5 µm, and the track width $W_{TI}$ of the inductive thin film recording head is, for example, 3 µm.

Signals were recorded on and reproduced from a discrete recording medium 23 (FIG. 6) having recording tracks of a track width of 3 µm and arranged at a track pitch of 5 µm in a track density of 5000 tpi by using the composite thin film recording/reproducing head thus constructed. The variation of the reproducing output could be avoided without entailing increase in reproducing noise and the reproducing characteristics of the composite thin film recording/reproducing head were satisfactory.

The present invention is not limited to the foregoing composite thin film recording/reproducing head in its application; the present invention is applicable also to those of different constructions including a composite thin film recording/reproducing head having a single magnetic gap serving as both the magnetic gap of the MR thin film reproducing head and that of the inductive thin film recording head.

Although the invention has been described in its preferred forms with a certain degree of particularity, obviously many changes and variations are possible therein. It is therefore to be understood that the present invention may be practiced otherwise than as specifically described herein without departing from the spirit and scope thereof.

What is claimed is:

1. In a system incorporating a recording/reproducing head and a record medium of a discrete track type, a composite thin film recording/reproducing head having improved noise characteristics for use with a record medium of a discrete track type comprising, in an integral laminate construction;

a magnetoresistance effect thin film reproducing head comprising a magnetoresistance effect element consisting of magnetoresistance effect magnetic layers and a nonmagnetic intermediate layer formed between the magnetoresistance effect magnetic layers, and a front electrode formed to be exposed to the air bearing surface of the magnetoresistance effect thin film reproducing head so that a signal current flows through the magnetoresistance effect element in a direction perpendicular to the air bearing surface; and an inductive thin film recording head;

wherein the trackwidth of the magnetoresistance effect thin film reproducing head is greater than that of the inductive thin film recording head, whereby a portion of said reproducing head is located on the discrete recording track and a portion of said reproducing head extends beyond said discrete recording track.

* * * * *